Figure 4:
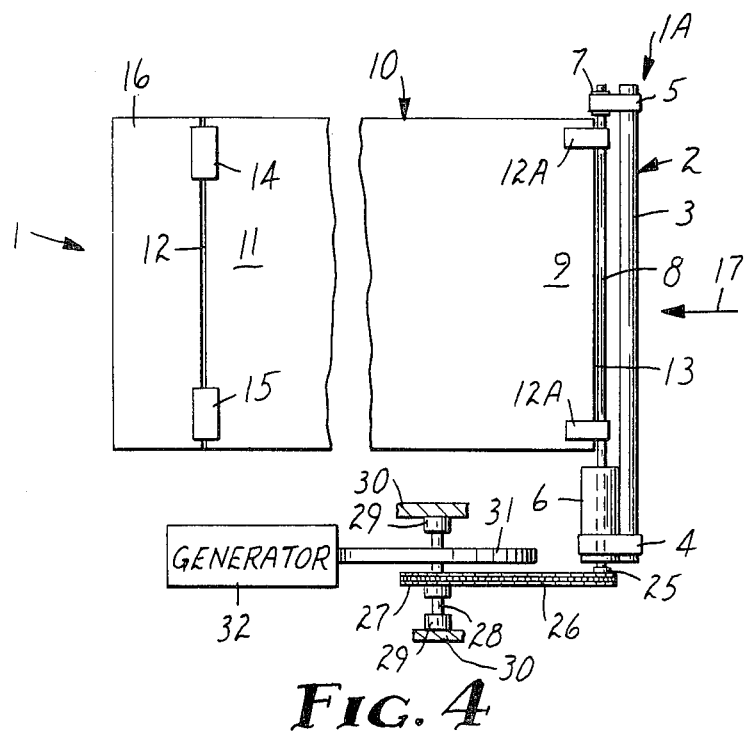

United States Patent [19]

Eldredge et al.

[11] Patent Number: 4,486,145
[45] Date of Patent: Dec. 4, 1984

[54] FLUID MACHINE

[76] Inventors: Charles L. Eldredge; John T. Eldredge, both of Box 207, Fessenden, N. Dak. 58438

[21] Appl. No.: 345,471

[22] Filed: Feb. 3, 1982

[51] Int. Cl.³ .............................................. F03D 5/06
[52] U.S. Cl. ........................................ 416/82; 416/83
[58] Field of Search ................... 416/79, 82, 83, 9

[56] References Cited

U.S. PATENT DOCUMENTS

| | | | |
|---|---|---|---|
| 393,316 | 11/1888 | Trumble . | |
| 395,530 | 1/1889 | Trumble | 416/79 |
| 3,256,850 | 6/1966 | Bramson . | |
| 3,442,493 | 5/1969 | Smith | 263/78 |
| 3,867,058 | 2/1975 | Hendrickson | 416/79 X |
| 3,942,026 | 3/1976 | Carter | 416/9 X |
| 4,172,427 | 10/1979 | Kindred . | |
| 4,288,200 | 9/1981 | O'Hare | 416/9 X |

Primary Examiner—Philip R. Coe
Assistant Examiner—Arthur D. Dahlberg
Attorney, Agent, or Firm—Gary L. Griswold

[57] ABSTRACT

A fluid machine which converts fluid movement into a useful force utilizing a pivotally mounted first plate which is hingedly connected to a second plate, the first plate first contacting the moving fluid and the second plate causing the first plate to move.

10 Claims, 4 Drawing Figures

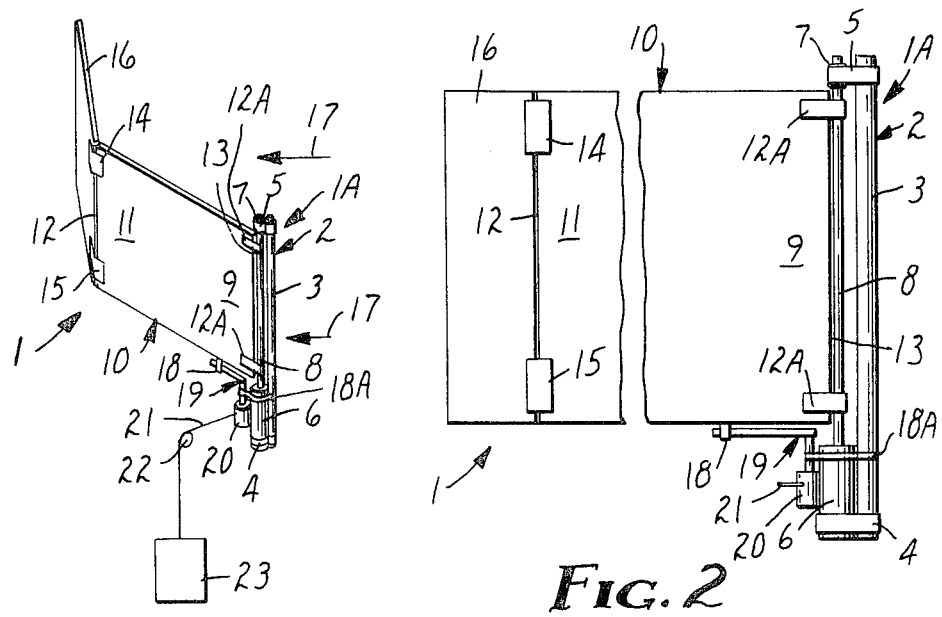
FIG. 1
FIG. 2
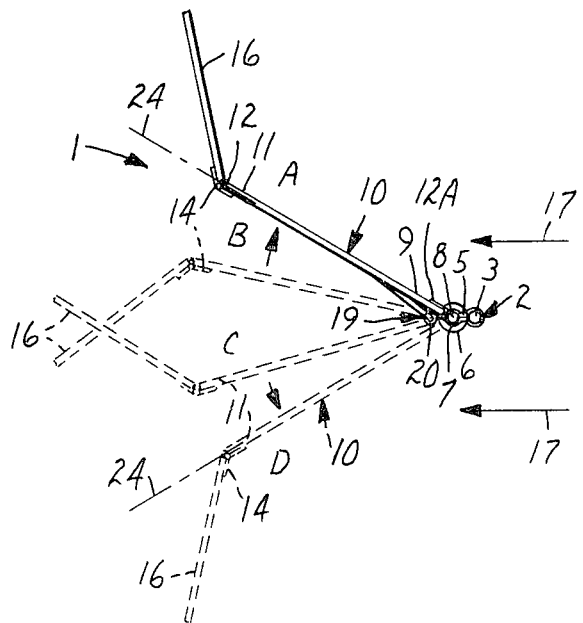
FIG. 3

FLUID MACHINE

This invention relates to a fluid machine, particularly this invention relates to a fluid machine which converts the movement of the fluid into a useful force. More particularly, this invention relates to a hinged plate apparatus which converts the movement of air into a useful force.

Various devices for converting moving fluid energy into useful forces are known. For example, windmills which contain vanes which rotate by the movement of air about an axis have been used for years to pump water, grind grain and to produce electricity. Windmills typically have limited power and work best in clean, i.e., nonturbulent air. Additionally, windmills normally have a tail fin which maintains the rotating vanes directed into the wind.

Another variant is the so-called water motor described in U.S. Pat. No. 393,316. This patent discloses the application of water, steam or air to a hinged plate device. In this device, the water, steam or air first contacts a plate which moves back and forth between stops and rotates a second plate to which a crank shaft is attached. The crank shaft turns when the second plate is moved. Other articulated vanes are disclosed in U.S. Pat. No. 3,442,493.

Applicants have discovered that a pivotally mounted fluidward plate which has a leeward plate hingedly attached to it will not center in clean or turbulent moving fluid, and that the movement of the plates thereby caused can be converted to a useful force. Applicants have, therefore, discovered an apparatus for converting the movement of fluid into a useful force comprising:
  (a) a device comprising:
    (1) a pivotally mounted first plate comprising a first pivotally mounted portion for first contacting a moving fluid and a second portion immediately adjacent and attached to said first portion for secondly contacting said moving fluid, and
    (2) a second plate hingedly connected to said second portion of said first plate at the end of said first plate opposite to that which is pivotally mounted, said second plate causing said first plate to move when fluid moves past said first plate and then past said second plate, and
  (b) means cooperating with said device for converting said movement of said device into a useful force.

Additionally, applicants have discovered a method for converting the movement of a fluid into a useful force comprising:
  (a) causing a moving fluid to move past the aforesaid apparatus and device in a direction to first contact the first plate of said device, and
  (b) converting the movement of said device into a useful force utilizing said means cooperating with said device for converting movement of said device into a useful force.

Preferred embodiments of applicants' invention will be described below in reference to the following drawings in which:

FIG. 1 is a perspective view of one embodiment of the apparatus of the present invention being utilized to perform mechanical work, FIG. 2 is a plan view of the apparatus of FIG. 1, FIG. 3 is a top view and depicts the movement of the apparatus of FIG. 1, and FIG. 4 is a plan view of a different embodiment of the present invention.

Referring to the drawings in detail, specifically FIGS. 1 and 2, apparatus 1 comprises device 1A. Device 1A comprises frame 2 comprising pipe 3 with attached brackets 4, 5 which include bearings 6, 7 respectively. Bearings 6, 7 contain shaft 8 and allow shaft 8 to rotate. Shaft 8 is attached to the first portion 9 of first plate 10 by means of brackets 12A. First plate 10 also contains second portion 11. Attached to end 12 of second portion 11 by means of hinges 14 and 15 is second plate 16. Hinges 14 and 15 reside at the opposite end 12 of first plate 10 to the end 13 of first plate 10 attached to shaft 8. Fluid 17 moves first past frame 2, then past first portion 9 of first plate 10, then past second portion 11 of first plate 10 and finally past second plate 16.

The means for converting the movement of fluid 17 into a useful force comprises ratchet implement 19 which is attached to first plate 10 by brackets 18 and attached to frame 2 by bracket 18A. Attached to ratchet implement 19 is mandrel 20 which contains line 21 which passes over pulley 22 and is attached to weight 23. As fluid 17 moves past first plate 10 and second plate 16 to move said first plate 10, as will be discussed later, ratchet implement 19 moves back and forth and causes mandrel 20 to turn, winding line 21 thereon and lifting weight 23.

FIG. 3 depicts device 1A in various positions. Fluid 17 passes first past frame 2 and then contacts first plate 10 and second plate 16. Four positions of first plate 10 and second plate 16 are shown in FIG. 3. In position A, first plate 10 has swung to the limit of the swing based on the direction of the flow of fluid 17 and second plate 16 has swung past the center line 24 of first plate 10. The movement of fluid 17 will then cause the first plate 10 to move toward position D. As it moves toward position D, second plate 16 will continue to follow first plate 10 as is shown in position C until such time as plate 10 reaches its limit shown in position D wherein second plate 16 moves past the center point 24 of first plate 10. When this occurs, fluid 17 will cause the first plate 10 and second plate 16 to move as shown in position D and in position B with second plate 16 following first plate 10 until the endpoint is reached again which is position A, at which time second plate 16 moves past centerpoint 24 of first plate 10 and the process repeats itself. The endpoint of movement of first plate 10 and second plate 16 is determined by the direction of fluid 17 and by the relative proportions of first plate 10 and second plate 16. Stops are not required. It has been found that devices 1A wherein first plate 10 is about 1.2 to 2 times larger in area than second plate 16 provides good results.

Without commiting to any theory, it is believed that when first plate 10 and second plate 16 move from position A to position D and vice versa, primarily two types of fluid and plate caused forces provide this movement. When first plate 10 and second plate 16 are moving from position A or D to a point where first plate 10 is about in line with the line of direction of moving fluid 17, it is believed that first plate 10 and second plate 16 are being primarily pushed, although some aerodynamic pull may also be involved. When first plate 10 and second plate 16 move from the point where first plate 10 is about in line with the line of direction of moving fluid 17 to position D or A, it is believed that first plate 10 and second plate 16 are primarily pulled by aerodynamic pull although some pushing may also be involved. When position A or D are reached, second plate 16 swings rapidly from its position following first plate 10 to the opposite side of first plate 10.

Second plate 16 does not allow first plate 10 to stop and swing back and forth about the line of direction of fluid 17 like a sail luffing into the wind. Instead, second plate 16 causes the first plate 10 and second plate 16 to move relatively distant from the line of direction of the fluid as depicted in FIG. 3. This movement of first plate 10 causes ratchet implement 19 to move, and in one direction to rotate and lift weight 23 by means of line 21 (FIGS. 1 and 2).

If frame 2 of apparatus 1 is not allowed to rotate 360°, i.e., is fixed, the fluid directions which the apparatus 1 can utilize is limited. Therefore, it is preferred to provide means to allow frame 2 to rotate 360° to accommodate fluid directions. Such means also provide a means for rotating weight 23 and pulley 22 and its support (not shown) with device 1A. A rotating table can be used to accomplish this.

FIG. 4 depicts another embodiment of the present invention with all portions of device 1A being the same. The means for converting the movement of first plate 10 into a useful force is different. In this case, a sprocket 25 is attached to shaft 8 so that when shaft 8 rotates, chain 26 attached to sprocket 25 rotates. This chain 26 is attached to another sprocket 27 which is geared to operate to turn shaft 28 in one direction of rotation of chain 26 but not to turn shaft 28 in the other direction of rotation of chain 26. Sprocket 27 rotates shaft 28 in bearings 29 in frame 30. Shaft 28 rotates flywheel 31 which causes generator 32 depicted in box form to generate electricity by engagement of the generator 32 and flywheel 31. Another variant of the apparatus 1 and device 1A of FIG. 4 which readily renders apparatus 1 and device 1A of FIG. 4 useful in all fluid directions is to remove frame 2 except for bearing 6 and attach bearing 6 to a support which does not interfere with a 360° rotation of shaft 8. If the size and weight of first plate 10 and second plate 16 makes it necessary, a counterbalance can be used to maintain a balanced apparatus.

The drawings also depict preferred embodiments of the present invention which utilize the movement of the first plate 10 to provide the useful force. Movement of the second plate 16 can also be used to provide this force if used with means such as a magnetic field which uses movement of the second plate 16 in the field to produce electrical force or other means which cooperate with the second plate 16 but do not significantly impede its movement.

The preferred means for converting the movement of the device 1A into a useful force is to use means which cooperates with the first plate 10. The first plate 10 normally provides more power but less speed than second plate 16. The speed of second plate 16 is obtained when it moves across the centerline 24 of first plate 10 at the limit of travel of first plate 10.

Means for allowing first plate 10 to pivot other than that depicted in the drawings can be used. For example, a bearing or bearings can be attached to end 13 of first plate 10 which allow first plate 10 to rotate on a shaft. Other means will be apparent to one skilled in the art.

The means cooperating with the device 1A for converting movement of the device 1A into a useful force have been depicted in the form of a ratchet implement and electrical generator/flywheel system. Other conversion means known to one skilled in the art such as fields for converting movement of the device into electrical force can be used.

The apparatus of the present invention can be made by conventional methods such as shearing, welding, cutting, etc. First plate 10 and second plate 16 can be made of any suitably stiff material such as sheet metal, plywood, plastic sheeting such as acrylic sheeting, cardboard, etc. The other parts of the apparatus are steel or other suitable material. An apparatus depicted in FIGS. 1–3 was made wherein plate 10 was 3 feet long and 2 feet high and the second plate was 2 feet long and 2 feet high. The plate was made from ½ inch plywood. Attachment of the ratchet handle 6 inches from the shaft 8 produced the shortest stroke with the greatest power lifting 46 pounds in a wind of 20 miles per hour. As the point of attachment of the handle of the ratchet implement to first plate 10 was increased in distance from the shaft, the stroke increased while the power decreased.

While the apparatus and method of the present invention can, if the apparatus is made from appropriate materials, be utilized or performed in other fluids such as water or steam, it is preferred that the apparatus and method be utilized and practiced in atmospheric air.

While preferred embodiments of the apparatus and method have herein been described in detail, those familiar with this art will recognize various alternative methods and embodiments for practicing the present invention are defined by the following claims.

What is claimed is:

1. An apparatus for converting the movement of fluid into a useful force comprising:
   (a) a device comprising:
      (1) a pivotally mounted first plate comprising a first pivotally mounted portion for first contacting a moving fluid and a second portion immediately adjacent and attached to said first portion for secondly contacting said moving fluid, and
      (2) a second plate hingedly connected to said second portion of first plate at the end of said first plate opposite to that which is pivotally mounted, said second plate without contact with a stop causing said first plate to move when fluid moves past said first plate and then past said second plate, and
   (b) means cooperating with said device for converting said movement of said device into a useful force.

2. The apparatus of claim 1 wherein said means cooperating with said device for converting said movement of said device into a useful force comprises a means for converting movement of said device into an electrical force.

3. A method for converting the movement of a fluid into a useful force comprising:
   (a) causing a moving fluid to move past the apparatus and device of claim 1 in a direction to first contact the first plate of said device, and
   (b) converting the movement of said device into a useful force utilizing said means cooperating with said device for converting movement of said device into a useful force.

4. An apparatus for converting fluid movement into a useful force comprising:
   (a) a device comprising:
      (1) a pivotally mounted first plate comprising a first pivotally mounted portion for first contacting a moving fluid and a second portion immediately adjacent and attached to said first portion for secondly contacting said moving fluid, and (2) a second plate hingedly connected to said second portion of first plate at the end of said first plate opposite to that which is pivotally mounted, said second plate without contact with a stop causing said first plate to move when fluid moves past said first plate and then past said second plate, and (b) means cooperating with said first plate for converting said movement of said first plate into a useful force.

5. The apparatus of claim 4 wherein said first plate is about 1.2 to 2 times larger in area than said second plate.

6. The apparatus of claim 4 wherein said first plate is attached to a rotatable shaft.

7. The device of claim 6 wherein said means cooperating with said first plate is a gear attached to said shaft attached to said first plate.

8. The apparatus of claim 4 wherein said first plate is attached to a shaft by means of at least one bearing mounted on an end of the first portion of said first plate.

9. The device of claim 4 wherein said means cooperating with said first plate is a ratchet implement attached to said first plate.

10. A method for converting the movement of a fluid into a useful force comprising:
(a) causing a moving fluid to move past the apparatus and device of claim 4 in a direction to first contact the first plate of said device, and
(b) converting the movement of said first plate into a useful force utilizing said means cooperating with said first plate for converting movement of said first plate into a useful force.

* * * * *